(12) United States Patent
Broer

(10) Patent No.: US 7,722,228 B2
(45) Date of Patent: May 25, 2010

(54) METHOD AND APPARATUS FOR INSULATING HYDROPONIC LAMPS

(76) Inventor: Paul Ernest Broer, 3755 33rd St., San Diego, CA (US) 92104

( * ) Notice: Subject to any disclaimer, the term of this patent is extended or adjusted under 35 U.S.C. 154(b) by 114 days.

(21) Appl. No.: 12/151,356

(22) Filed: May 6, 2008

(65) Prior Publication Data
US 2009/0279315 A1    Nov. 12, 2009

(51) Int. Cl.
*F21V 29/00* (2006.01)
(52) U.S. Cl. .................. 362/373; 362/264; 362/294
(58) Field of Classification Search ........... 362/264, 362/265, 294, 373
See application file for complete search history.

(56) References Cited

U.S. PATENT DOCUMENTS

| 6,595,662 | B2 * | 7/2003 | Wardenburg ............. 362/362 |
| 7,524,090 | B2 * | 4/2009 | Hargreaves ............. 362/294 |
| 2006/0053691 | A1 | 3/2006 | Harwood et al. |
| 2008/0052987 | A1 | 3/2008 | Busch et al. |
| 2008/0074880 | A1 | 3/2008 | Keen et al. |

* cited by examiner

*Primary Examiner*—John A Ward
(74) *Attorney, Agent, or Firm*—Harry V. McGahey Esq.; McGahey & McGahey, APLC

(57) ABSTRACT

A kit and process for retrofitting hydroponic lamp hoods with thermal insulation, and an apparatus for a thermally insulated hydroponic light hood.

8 Claims, 10 Drawing Sheets

METHOD AND APPARATUS FOR INSULATING HYDROPONIC LAMPS

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of hydroponic lamp hoods and more specifically to an insulated lamp hood and a kit for retrofitting hydroponic lamp hoods with insulation.

Hydroponic gardening methods have been reported for thousands of years. The famed hanging gardens of Babylon have been speculated to have been hydroponic in nature. Recently hydroponic gardening has had a resurgence of popularity in part because of increasingly sophisticated systems and equipment being available to the public including high intensity lamps. These lamps produce large amounts of light in spectrums which plants use very efficiently to grow.

High intensity lamps being used in hydroponic systems have one recurrent unsolved problem which is how to dissipate or control the high amounts of heat generated by the high intensity lamps. Although hydroponic systems generally work well with some heat, very high temperatures are counterproductive. Eliminating the high heat from the high intensity lamps is a serious and significant problem in medium and large scale hydroponic systems.

BRIEF SUMMARY OF THE INVENTION

The primary object of the invention is To provide a better way of insulating and reducing heat escape from hydroponic lamps. The current invention solves this problem by utilizing thermal insulation which is placed around the light lamp hoods. This invention has the further advantage of being able to retrofit existing hydroponic systems as well as to be incorporated into new hood systems as they are manufactured.

There are two basic preferred embodiments to this invention. One is the retrofit system for currently existing systems. The other is a method of constructing new hydroponic lamp hoods incorporating the insulation. Both of these embodiments use the same insulation material. In the preferred embodiment, this insulating surface material is comprised of a center layer of polyethylene sandwiched between two layers of insulating bubbles of polyethylene, each of which is bonded to a layer of polyethylene for strength, each layer of polyethylene of which is bonded to an outer layer of aluminum foil. One currently available product on the market goes by the name of Reflectix®. In the preferred embodiment using this commercially available product the reflective insulation used is approximately 5/16 inches thick. However the insulating material may be comprised of any heat resistant insulation including fiberglass insulation. It may also be any thickness desired.

In the first preferred embodiment the thermal insulation is supplied in a kit which allows the hydroponic lamp hood to be retrofitted to contain the thermal output of the lamp bulb inside the hood until the heat can be exhausted. Typically the heat is exhausted by using a fan or other means to carry the heat away from the hood.

In the second preferred embodiment, the thermal insulation is integrated into the lamp hood during the actual construction or manufacture of the hood itself.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a kit for retrofitting hydroponic lamp hoods with thermal insulation comprising: a hydroponic light hood, a first sheet of thermal insulating material shaped to cover the upper top surface of the hydroponic light hood, a second sheet of thermal insulation material shaped to cover one side of the hydroponic light hood, a third sheet of thermal insulating material shaped to cover the opposite side of the hood, and an attachment means to affix the first, second and third sheet of thermal insulation material to the hydroponic light hood.

In accordance with a preferred embodiment of the invention, there is also disclosed a process for retrofitting hydroponic lamps with thermal insulation material comprised of: selecting the hydroponic light hood to be retrofitted, obtaining a sheet of thermal insulating material shaped to cover the upper top surface of the hood, obtaining a second sheet of thermal insulation material shaped to cover one side of the hood, obtaining a third sheet of thermal insulating material shaped to cover the opposite side of the hood, placing the first, second and third sheets of thermal insulating material into place on the top and sides of the hood, and using an attachment means to affix the first, second and third sheet of thermal insulation material to the top and sides of the hood.

In accordance with a preferred embodiment of the invention, there is also disclosed an insulated hydroponic lamp hood comprising: a hydroponic light hood having a top surface and a plurality of side surfaces, a sheet of thermal insulating material shaped to cover the upper top surface of the hood placed on top of the hood, a plurality of sheets of thermal insulation material shaped to cover each side of the hood placed on each side of the hood, a rigid heat resistant material placed on top of the thermal insulating material which was placed on top of the hood, a rigid heat resistant material placed on top of the thermal insulating material covering each of the sides of the hood: and an attachment means to affix the plurality of rigid heat resistant material covering the sheets of thermal insulation material on the top and sides of the hood,

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
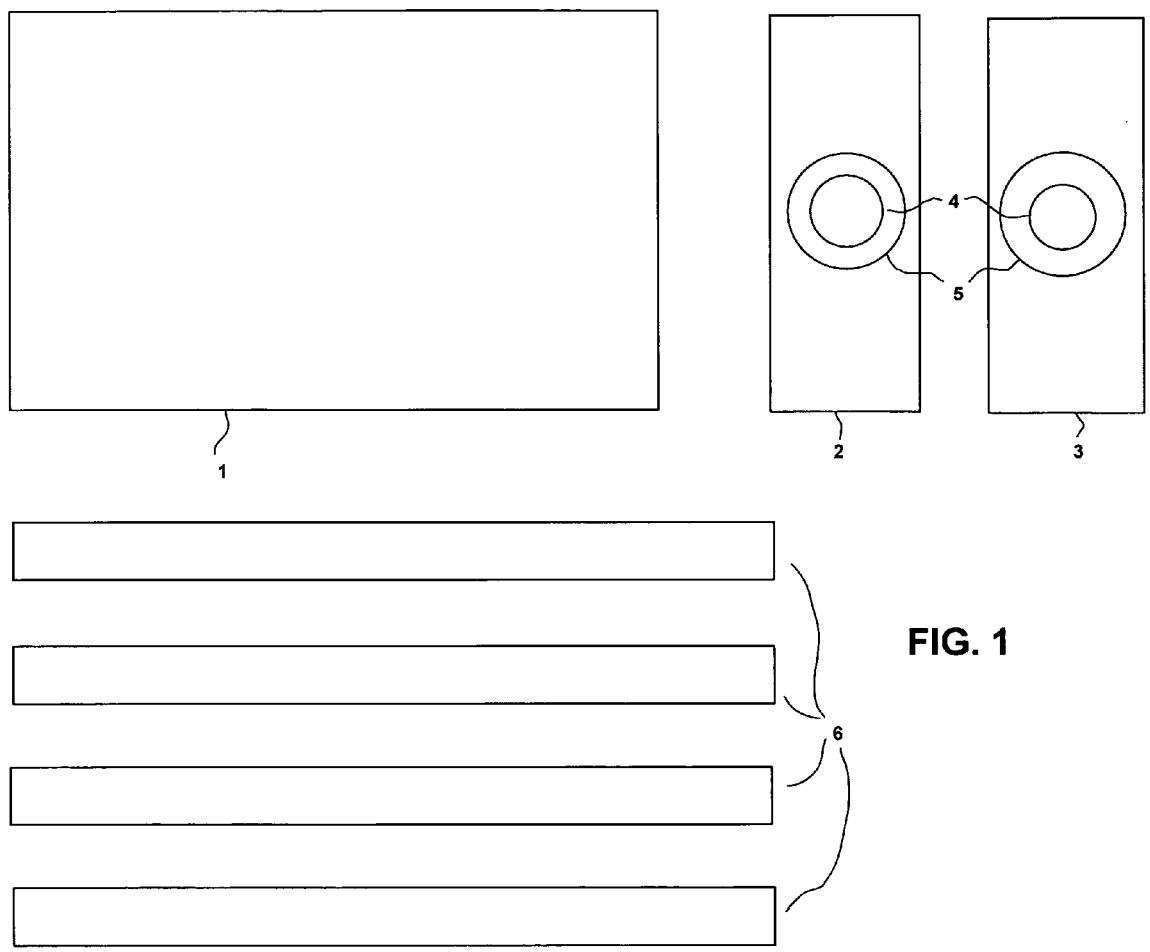
FIG. 1 is a plan view of the kit template for retrofitting a hydroponic lamp hood.

Turning to the first figure. FIG. 1 is a plan view of the preferred embodiment of the kit template for retrofitting a lamp hood. The shape of the first sheet of thermal insulating material (1) shaped to cover the upper top surface of a hydroponic light hood is shown next to the shape of the second sheet of thermal insulating material (2) shaped to cover one side of the hood. Also shown is the shape of the third sheet of thermal insulating material (3) to cover the opposite side of the hood. The locations of the small concentric circular patterns (4) and the large concentric circular patterns (5) to allow cut outs for the air ducts on the typical lamp hood are also shown in place on the patterns for the second sheet (2) and third sheet (3) of insulating material. Four long pieces of thermal insulating adhesive tape (6) are also included in the preferred embodiment to affix the thermal insulating material to the top and sides of the hood. The kit can be made any size to fit any type shape of lamp hood. However, in the preferred embodiment, the first sheet measures 30 inches wide by 24¼ inches high, the second and third sheets are 26 inches high by 12 inches wide, the two concentric circular patterns on each second and third sheet measure 5½ inches in diameter and 8 inches in diameter. These sizes will fit the standard type of exhaust duct found on most hydroponic hoods. Even if there are extrusions on the top or sides of the hood which do not match the circular patterns on the preferred embodiment of the kit, a person can cut out the necessary patterns to match the extrusions which may be present. The preferred embodiment kit also contains four strips of heat resistant reflective tape, each measuring 2¾ inches wide by 36 inches long. In the preferred embodiment, the heat resistant thermal insulating material is a seven layer, reflective insulation comprised of two outer layers of aluminum foil, each layer of foil bonded on its inner side to a tough layer of polyethylene for strength, a center layer of polyethylene for strength between the two layers of aluminum foil, and two inner layers of insulating bubbles comprised of polyethylene to resist conductive heat flow, one on each side of the center layer of polyethylene. However heat resistant fiberglass can also be used.

Figure 2:
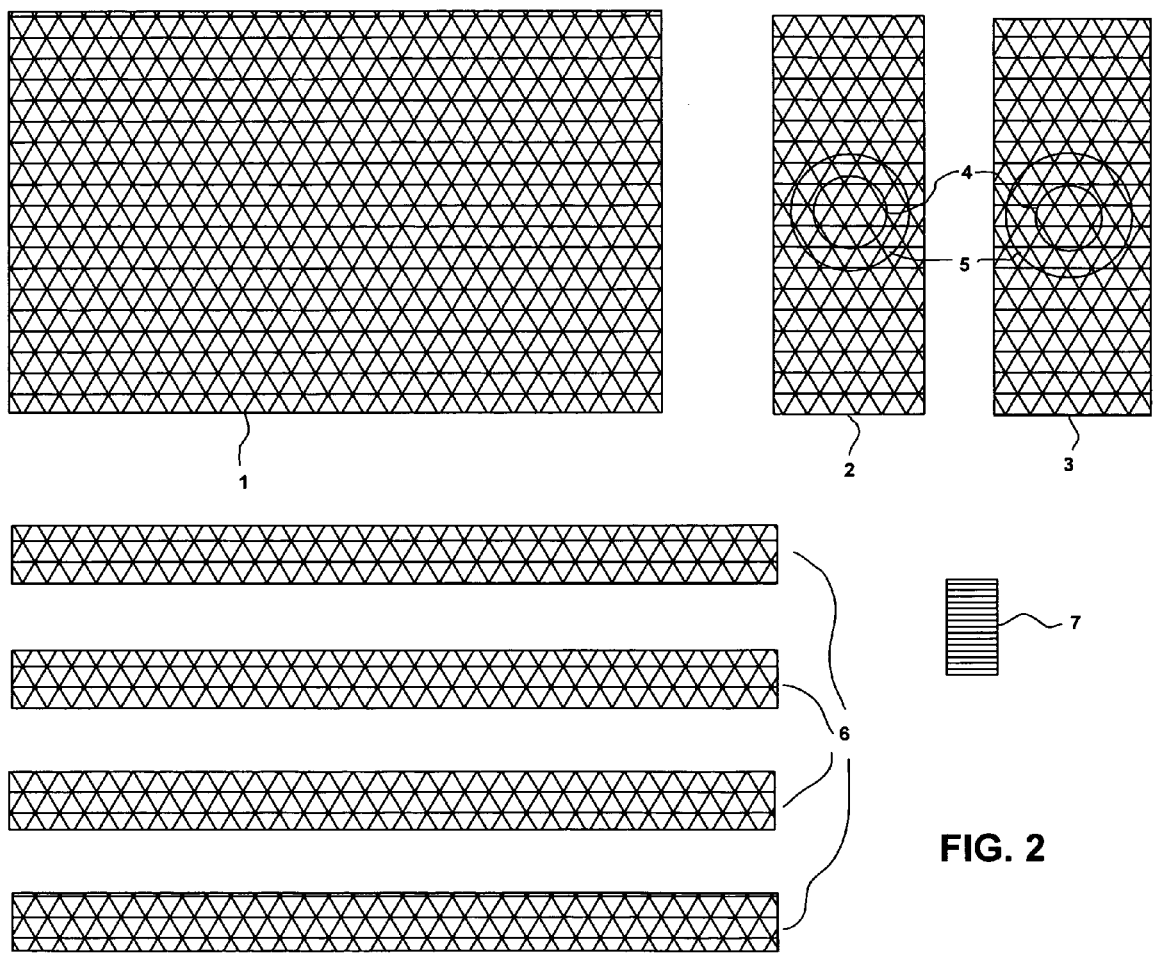
FIG. 2 is a plan view of the kit for retrofitting a hydroponic lamp hood actually comprised of the heat resistant thermal reflective material used to make it.

FIG. 2 is a plan view of the kit for retrofitting a lamp hood actually comprised of the heat resistant thermal reflective material used to make it. The first sheet of thermal insulating material (1) shaped to cover the upper top surface of a hydroponic light hood is shown next to the second sheet of thermal insulating material (2) shaped to cover one side of the hood. Also shown is the third sheet of thermal insulating material (3) to cover the opposite side of the hood. The small concentric circular patterns (4) and the large concentric circular patterns (5) placed on the actual thermal insulating material to allow cut outs for the air ducts on the typical lamp hood are also shown in place on the second sheet (2) and third sheet (3) of insulating material. The four long pieces of thermal insulating adhesive tape (6) used to affix the thermal insulating material to the top and sides of the hood are visible also. The tape means (7) for sealing the kit once it is prepared and ready to be rolled up for easy storage is also shown.

Figure 3:
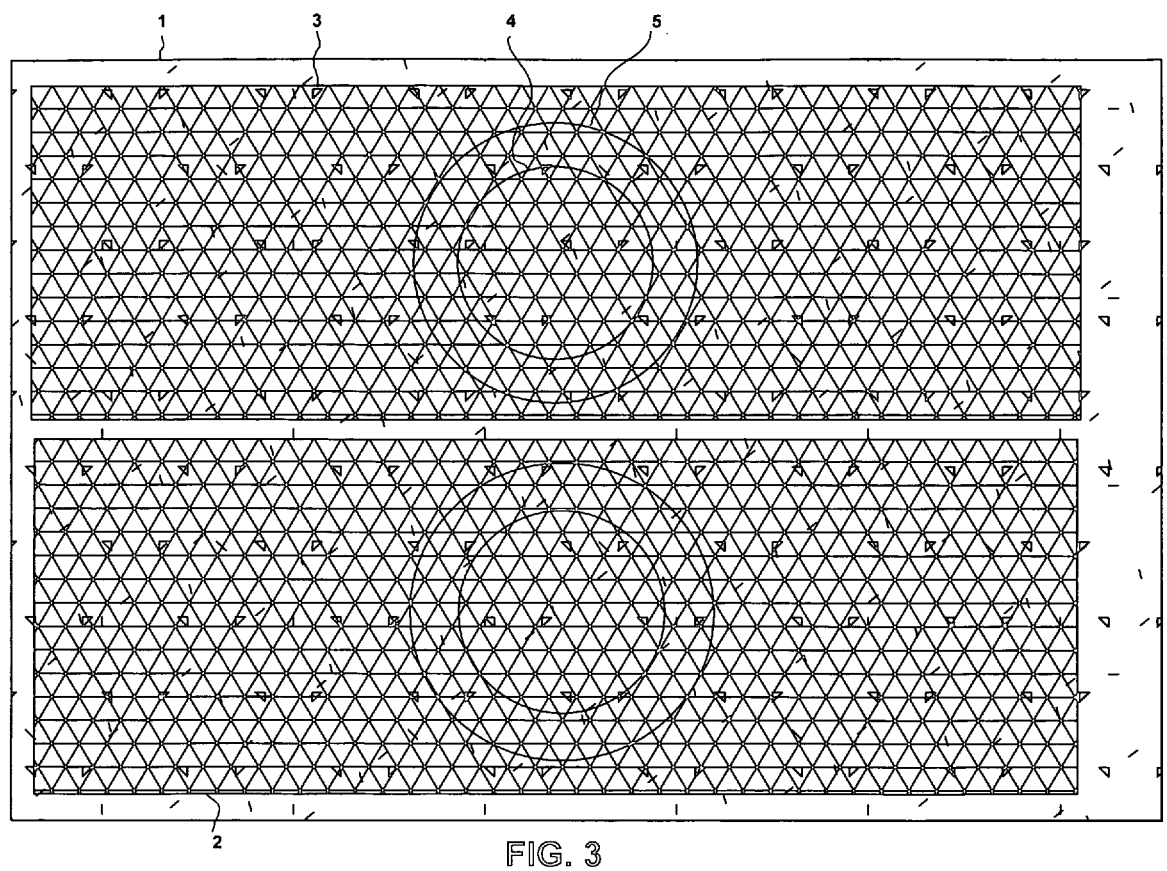
FIG. 3 is a plan view of a partially assembled kit for retrofitting a hydroponic lamp hood.

FIG. 3 is a plan view of a portion of the kit for retrofitting a lamp hood. Once the retrofitting kit components are ready to be combined into one package, in the preferred embodiment, the first sheet of thermal insulating material (1) shaped to cover the upper top surface of a hydroponic light hood is placed on the bottom. Then the second sheet of thermal insulating material (2) shaped to cover one side of the hood and the third sheet of thermal insulating material (3) used to cover the opposite side of the hood are laid on top of the first sheet (1). The locations of the small concentric circular patterns (4) and the large concentric circular patterns (5) to allow cut outs for the air ducts on the typical lamp hood can be seen on the second sheet (2) and third sheet (3) of insulating material.

Figure 4:
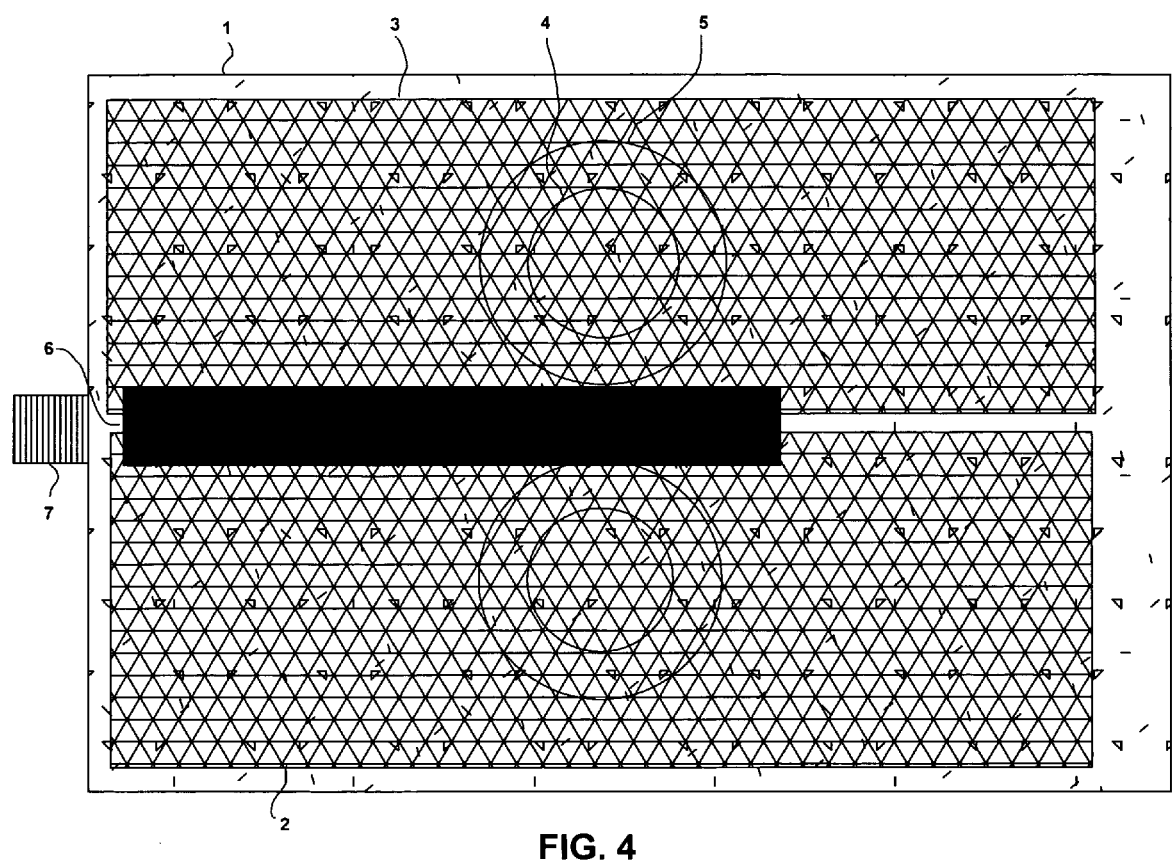
FIG. 4 is a plan view of a complete kit for retrofitting a hydroponic lamp hood ready to be rolled up into a cylinder.

FIG. 4 is a plan view of a complete kit for retrofitting a lamp hood. After the first sheet (1), second sheet (2) and third sheet (3) are in place, the four long pieces of thermal insulating adhesive tape (6) are folded and placed between the second sheet (2) and third sheet (3). The piece of adhesive means (7) to allow the entire package to be rolled up into a compact unit is also shown.

Figure 5:
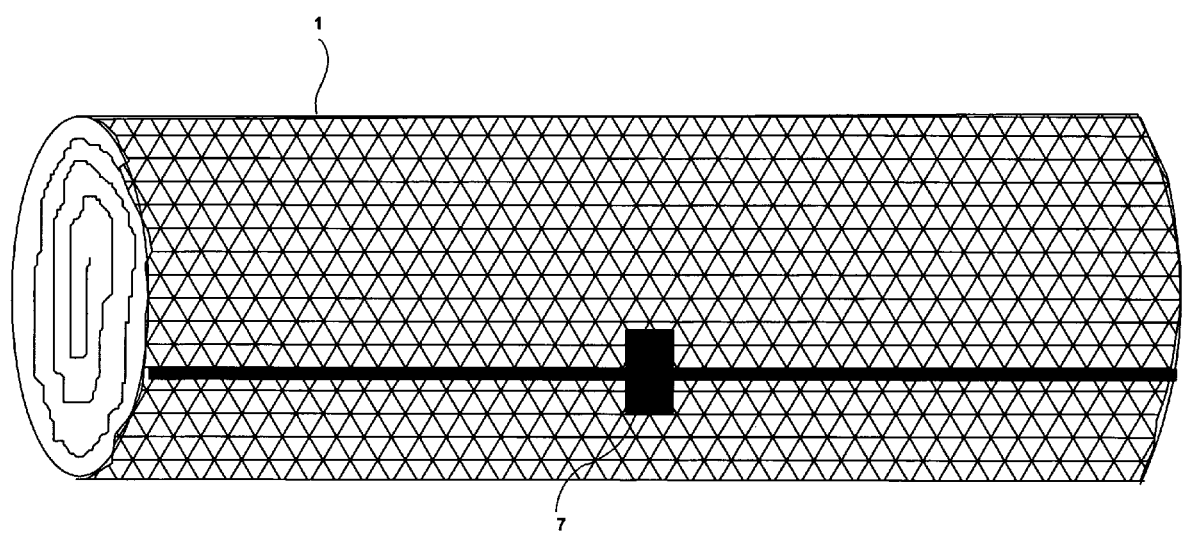
FIG. 5 is a perspective view of a complete kit for retrofitting rolled up and closed by an attachment means.

FIG. 5 is a perspective view of a complete kit for retrofitting rolled up and taped. In the preferred embodiment, the outside of the first sheet of thermal insulating material (1) is can be seen after the entire kit is rolled up and secured with the piece of adhesive tape means (7).

Figure 6:
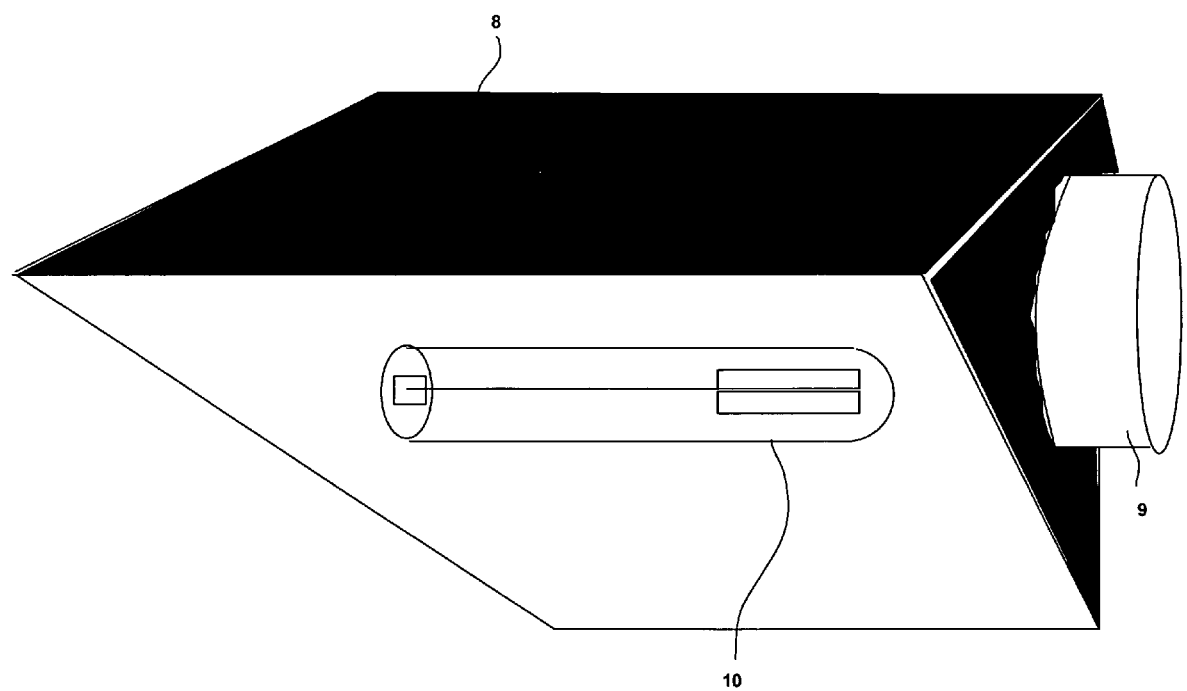
FIG. 6 is a perspective view of a typical hydroponic lamp hood prior to installing the thermal insulation on it.

FIG. 6 is a perspective view of a lamp hood prior to installing the thermal insulation on it. The exterior of the hood (8) and a lamp bulb (10) is visible along with a typical air duct (9) which is usually in the location shown.

Figure 7A:
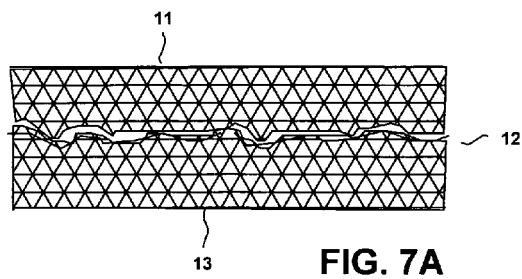
FIG. 7A is a cross-sectional view of the heat resistant thermal insulating material comprising the preferred embodiment.

FIG. 7A is a cross-sectional view of the heat resistant thermal insulating material comprising the second preferred embodiment which is a lamp hood having the thermal insulating sandwiched between two rigid surfaces. The exterior cover surface of the light hood (11) is shown with the thermal insulating material (12) in between the interior cover surface (13) of the lamp.

Figure 7B:
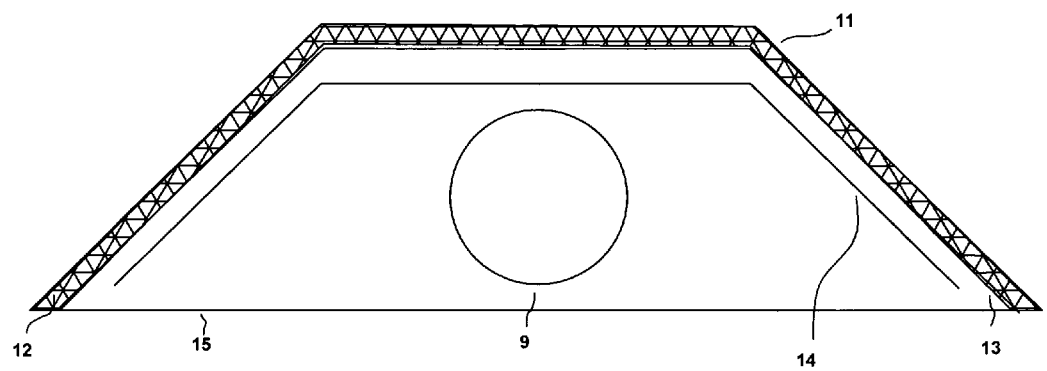
FIG. 7B is a cross-sectional view of a lamp hood once the heat resistant thermal insulating material is place on the top of it.

FIG. 7B is a cross-sectional view of a lamp hood comprising the second preferred embodiment once the heat resistant thermal insulating material is place on the top of it. The thermal insulating material (12) is shown with an exterior cover (11) of a rigid heat resistant material, the interior cover (13), a lamp reflector (14 which may be present, a sheet of reflector hood glass (15) which also may or may not be present, and the location of a typical air duct (9).

Figure 8:
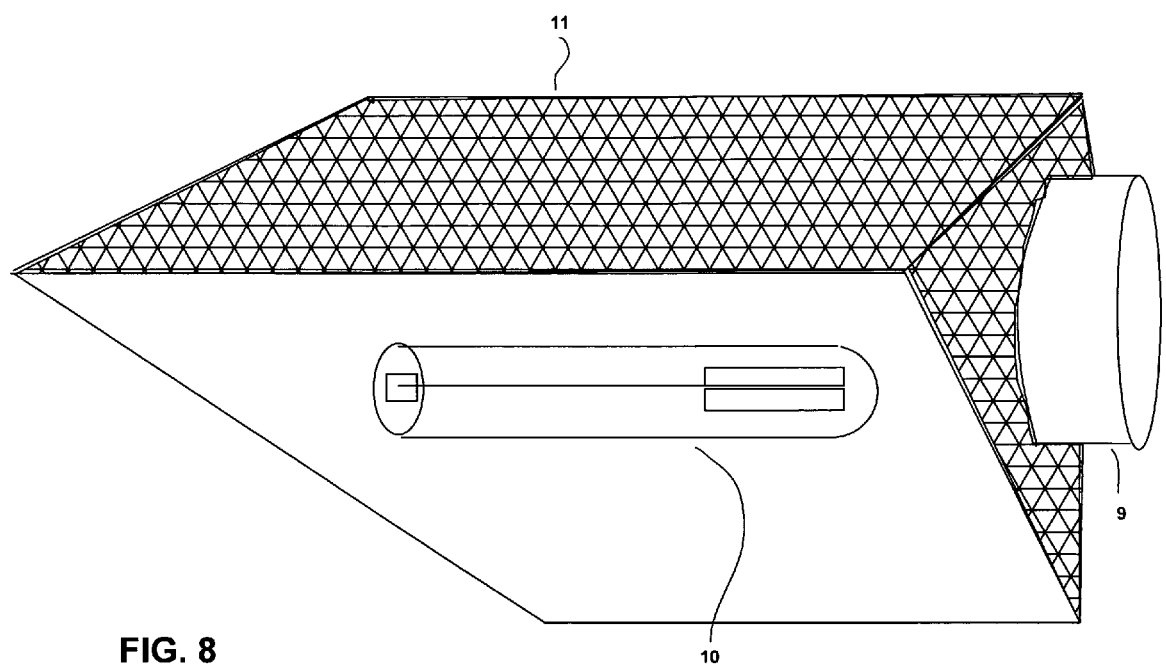
FIG. 8 is a perspective view of a lamp hood with the heat resistant thermal insulating material in place on top and showing on one of the sides.

FIG. 8 is a perspective view of a lamp hood being retrofitted with the heat resistant thermal insulating material in place on top and showing on one of the sides. The exhaust duct (9) is protruding out from where a circular pattern hole has been cut in the insulating material to allow the duct (9) to extend out of the insulating material. The location of the lamp (10) can also be seen. FIG. 8 shows what the retrofitting kit of the first embodiment looks like before the adhesive means has been put in lace to affix the insulation to the hood.

Figure 9:
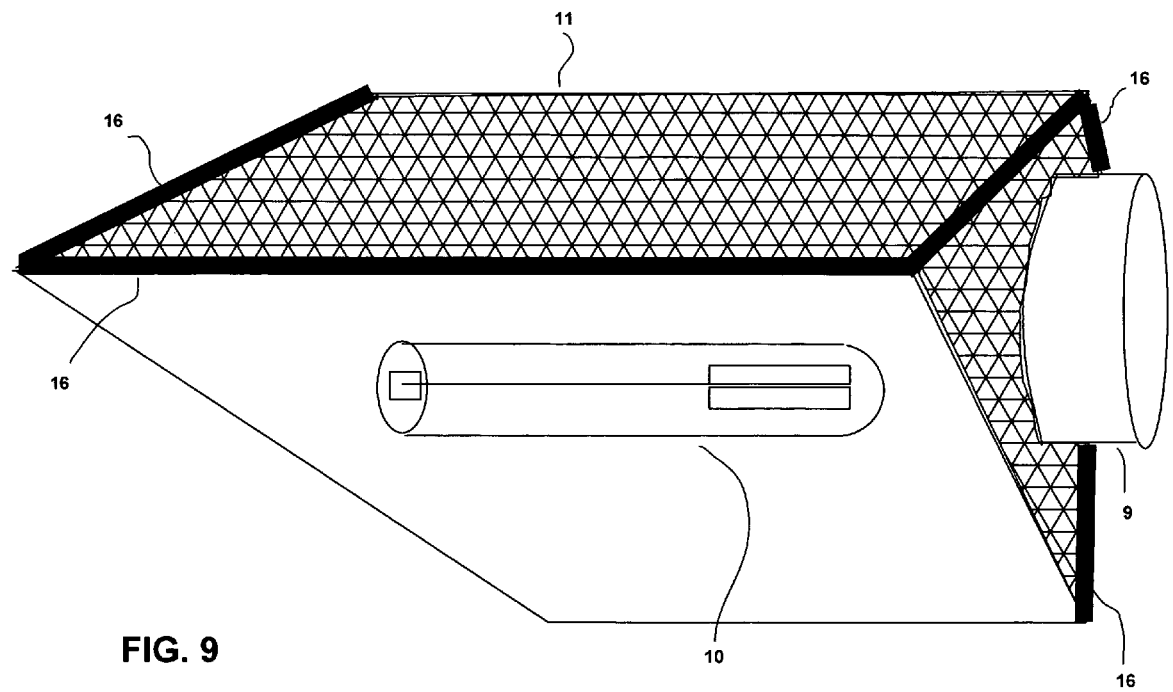
FIG. 9 is a close up cross-sectional view of a lamp hood with the heat resistant thermal insulating material on the top of it and on one of the sides held in place by adhesive tape.

FIG. 9 is a close up cross-sectional view of a lamp hood showing the lamp bulb (10) with reflective hood glass on the bottom and the heat resistant thermal insulating material on the top of it and on one of the sides. The air duct (9) protruding out of one of the side sheets of insulating material can also be seen. Now the four long pieces of heat resistant tape (16) have been applied to hold the thermal insulating material onto the exterior of the hood.

Figure 10:
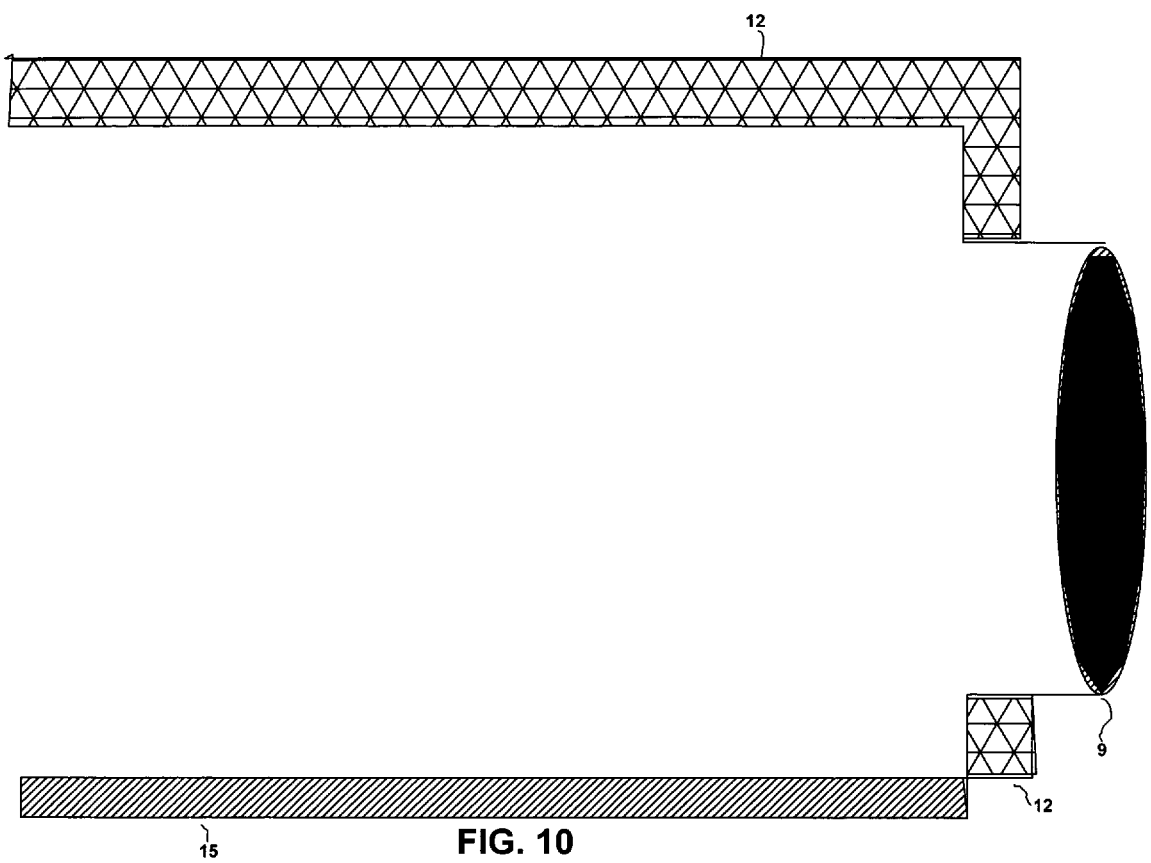
FIG. 10 is a cross-sectional view of a typical lamp assembly with the thermal insulating material built into the walls of the lamp housing itself.

FIG. 10 is a cross-sectional view of a typical lamp assembly as described in the second preferred embodiment where the thermal insulating material (12) is built into the lamp assembly itself. The reflector hood glass (15) is also shown, as is the air duct (9). The attachment means to attach the rigid material which holds on the thermal insulation can be any attachment means including but not limited to: screws, bolts, spot welds or inside cavities created during construction.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An insulated hydroponic lamp hood comprising:
   a hydroponic light hood having a top surface and a plurality of side surfaces;
   a sheet of thermal insulating material shaped to cover the upper top surface of the hood placed on top of the hood;
   a plurality of sheets of thermal insulation material shaped to cover each side of the hood placed on each side of the hood;
   a rigid heat resistant material placed on top of the thermal insulating material placed on top of the hood;
   a rigid heat resistant material placed on top of the thermal insulating material covering each side of the hood;
   an attachment means to affix the plurality of rigid heat resistant material covering the sheets of thermal insulation material on the top and sides of the hood.

2. The hood in claim 1 wherein the plurality of orifices are formed during the actual manufacturing of the hood so as to allow any extrusions on the top of the surface of the hood to extend out of the thermal insulation when the insulation is affixed to the hood.

3. The hood in claim 1 wherein the attachment means to secure the rigid heat resistant material to the top surface of the hood and the plurality of its side surfaces is comprised of a plurality of screws.

4. The hood in claim 1 wherein the attachment means to secure the rigid heat resistant material to the top surface of the hood and the plurality of its side surfaces is comprised of bolts.

5. The hood in claim 1 wherein the attachment means to secure the rigid heat resistant material to the top surface of the hood and the plurality of its side surfaces is comprised of heat resistant adhesive.

6. The hood in claim 1 wherein the attachment means to secure the rigid heat resistant material to the top surface of the hood and the plurality of its side surfaces is comprised of spot welds.

7. The hood in claim 1 wherein the heat resistant thermal material is placed inside pre formed cavities created during the construction of the hood.

8. The hood in claim 1 wherein the heat resistant thermal insulating material is a seven layer, reflective insulation comprised of two outer layers of aluminum foil, each layer of foil bonded on its inner side to a tough layer of polyethylene for strength, a center layer of polyethylene for strength between the two layers of aluminum foil, and two inner layers of insulating bubbles comprised of polyethylene to resist conductive heat flow, one on each side of the center layer of polyethylene.

* * * * *